United States Patent Office 2,706,159
Patented Apr. 12, 1955

2,706,159

MANUFACTURE OF ARTIFICIAL SPONGES

Petrus Johannes Kreek, Ede-Gld, and Pieter Hendrik Teunissen, Arnhem, Netherlands, assignors to American Enka Corporation, Enka, N. C., a corporation of Delaware No Drawing. Application February 13, 1952, Serial No. 271,450

Claims priority, application Netherlands March 9, 1951

3 Claims. (Cl. 106—122)

This invention relates to the manufacture of artificial sponges made from cellulose. More particularly, this invention relates to a process for manufacturing artificial sponges from an alkaline cellulose solution, such as viscose.

It is well known to manufacture cellulose sponges by mixing an alkaline cellulose solution such as viscose with a poreforming material, together with some fibrous material. As poreforming material, salt crystals such as decahydrated sodium sulphate (Glauber's salt) have been used. A short-staple fiber, such as cotton, has usually been employed as the fibrous material, although it has been proposed to use stronger fibers, such as hackled flax or hemp.

The alkaline cellulose solution, together with the poreforming substance and the re-inforcing fibers are formed into a paste. The paste is then usually introduced into molds where the coagulation and decomposition is accomplished in a way well known to those skilled in the art. The decomposed shaped articles obtained are then separated from the salts and other impurities by washing, after which they are cut to the desired dimension and dried.

The artificial sponges obtained according to the known methods have been found to possess certain undesirable features. When using cotton or similar material as the fibrous material, sponges are obtained with very suitable properties so far as swell, water absorption and moistening are concerned. The strength of such fibers, however, has been found to be inferior.

When using natural bast fibers such as hackled flax or hemp stronger sponges have been obtained, but these were found to possess disadvantages in that the swelling, water absorption and moistening properties were substandard.

This invention has as an object to provide an improved process for the manufacture of artificial sponges.

Another object of this invention is to provide a process for manufacturing artificial sponges of improved strength.

An additional object of this invention is to provide a process for manufacturing artificial sponges having desirable properties both with regard to strength and with regard to moistening, swelling, and water absorption.

A still further object of this invention is to provide a process for treating natural bast fibers to make them suitable for use in manufacturing artificial sponges.

Other and additional objects will become apparent from the disclosure which follows.

In accordance with the present invention, natural bast fibers such as hackled flax or hemp are at least partly freed from the accompanying pectin-like substances by means of chemical opening and purification, after which the fibers are mixed, preferably in a dried and willowed condition with the alkali cellulose and a poreforming substance, and the mixture is coagulated, decomposed and processed to sponges in the conventional way.

Commercially obtained, or so-called hackled flax, has usually been obtained by retting, beating, braking, scutching and finally hackling the natural fiber, and it is used as such in the industry. This material contains a high content of incrustations. Besides lignin, mineral substances, and traces of fats and oils, these incrustations consist for the greater part of so-called pectocellulose, which may be regarded as a combination of cellulose with pectic substances. These probably consist primarily of polygalacturonic acids having carboxyl groups which are partially esterified by means of methanol. The opening and purification of these fibers can be accomplished by treating them with dilute alkalis, e. g., sodium hydroxide solution, preferably at elevated temperatures. To prevent damage by oxidation, it is advisable to perform this treatment in the absence of air.

During this treatment a considerable loss in weight of the fibers occurs. It was surprisingly found that as the proportion of the loss in weight increases, the water absorption and moistening properties of the sponges prepared with these fibers also increases. For the preparation of sponges with good moistening and water absorption properties, it is necessary that the loss in weight of the bast fibers amount to at least 20%. When using flax fibers, a loss in weight of at least 25% is desirable. In the case of hemp fibers good results are obtained with a loss in weight of 20%. The best results are obtained by making sponges with flax fibers which have been treated until the weight loss amounts to 30-35%. Unfavorable results are obtained if the loss in weight exceeds 35%.

A very good purification is obtained if hackled flax is treated for two to three hours in an autoclave with ten parts of a 1% caustic soda solution at a temperature of 120° C. Under these conditions, the flax fiber loses 30–35% in weight. By cooking the hackled flax with ten parts of 6% caustic soda solution for eight hours at a temperature of 105° C., the loss in weight is only about 25%. It is possible to reach the desired loss in weight over a range of temperatures by varying the time of treatment and concentration of the alkaline opening agent.

Hemp fibers are somewhat more sensitive to the heat treatment, and with these fibers a hot solution of sodium carbonate or sodium silicate is preferred. The cooking must take place with not more than a slight excess pressure. During the treatment, the hemp fibers lose about 20% of their weight.

The fibers used in accordance with the present invention are preferably subjected to special physical treatments both before and after the above described chemical treatment. Before the chemical treatment, the hackled fibers are cut to a suitable staple, for example, 2 cm., and then opened. The loose fiber mass is then introduced into the digester, preferably maintaining a liquid-fiber mass ratio of 10:1. After cooking and washing, it is advisable to dry the fibers and then to willow them. The loose and dry fiber mass obtained in this way can then be finally distributed into the viscose or the viscose-salt mixture, as for example, by blowing in while stirring.

These special physical treatments accomplish a distinct improvement in the quality of the sponges produced for the following reason. During the opening step the bast fibers are automatically roughened up, and during the willowing step the fiber tops are more or less split up. Treatment of the fibers in this manner, then, produces a favorable influence on the degree of adhesion remaining between the fibers and the cellulose after the decomposition of the cellulose solution.

The method of practicing the present invention will be more fully explained in the following specific example, it being understood that the example is an illustrative embodiment of the invention and that the scope of the invention is not limited thereby.

Example

Commercially obtained hackled flax in skein form was cut to a staple of 2 cm. The cut fibers were opened in the conventional manner. A processing vessel so equipped that it could be closed and heated under pressure was filled with 1% caustic soda solution. A quantity of the cut flax was then added to the vessel so that the liquid-fiber ratio became 10:1, or 10% NaOH, calculated on the dry flax. The vessel was closed and the mass was cooked for three hours under pressure at 120° C., after which the NaOH was drained off. The fibers were then carefully washed, filtered and dried. It was found that the treated fibers had lost around 30% in weight. The dried fibers were then willowed three times. Next, 3.4 kg. of the dried fibers were blown into a viscose-salt mixture with the aid of compressed air, while stirring vigorously. This viscose-salt mixture was obtained by mixing 100 kg. of viscose having a cellulose content of 8.2% with 520 kg. of granular Glauber's salt. The mixture obtained in this way was brought into molds and decomposed therein according to the conventional procedure. The decomposed sponge mass was purified by washing and other standard aftertreatments, and thereafter cut to the desired size and dried.

The sponges obtained in the above example had a very good strength. They could be easily moistened, and the water absorption and swelling properties, when the sponges were squeezed out, satisfied all requirements. These sponges were compared with other sponges which had been manufactured in the same way except that 3.8 kg. of cotton had been added to the viscose-salt mixture instead of 3.4 kg. of the purified flax fibers. It was found that the sponges manufactured with the purified flax fibers could invariably be used at least twice and sometimes as much as four times as long as the sponges manufactured with cotton.

Sponges manufactured in accordance with the present invention have particularly attractive properties with regard to strength, moistening, swelling and water absorbability. They are especially recommended as general purpose sponges for the washing of automobiles or panes of glass where their durability is particularly noticeable. Sponges manufactured by a similar process but using hackled and not purified flax were found to have equal strength but were unserviceable for most purposes because their moistening and water absorption properties were bad. When a sponge made from the unpurified flax was squeezed out, it hardly swelled again.

What is claimed is:

1. A process for manufacturing artificial sponges from viscose solution which comprises the steps of cutting natural bast fibers to staple length, opening said fibers, treating said fibers with dilute sodium hydroxide solution at an elevated temperature, said treatment being continued until the loss in weight of said fibers amounts to at least 20% but not more than 35% of the original weight, washing, drying, and willowing said treated fibers, and thereafter mixing said fibers with viscose and decahydrated sodium sulphate crystals forming said mixture into a desired shape, and coagulating and decomposing the mixture to obtain a cellulose sponge.

2. Sponge-forming composition comprising viscose, re-inforcing fibers, and granules of a poreforming substance, said re-inforcing fibers consisting of the material obtained by treating natural blast fibers selected from the group consisting of flax and hemp with a dilute alkaline solution at an elevated temperature so that the loss in weight of said fibers from said treatment is at least 20% but not more than 35% by weight.

3. An artificial sponge manufactured in accordance with the process of claim 1.

References Cited in the file of this patent

UNITED STATES PATENTS

| Number | Name | Date |
|---|---|---|
| 1,406,410 | Peabody | Feb. 14, 1922 |
| 1,591,670 | Fischer | July 2, 1926 |
| 1,611,056 | Mostny | Dec. 14, 1926 |
| 1,716,006 | Rinman | June 4, 1929 |
| 1,909,521 | Bryant | May 16, 1933 |
| 1,974,393 | Mostny | Sept. 18, 1934 |
| 2,018,490 | Jones | Oct. 22, 1935 |
| 2,128,928 | Estes | Sept. 6, 1938 |
| 2,440,562 | Wise | Apr. 27, 1948 |
| 2,464,772 | Drisch | Mar. 15, 1949 |
| 2,495,237 | Petiton | Jan. 24, 1950 |
| 2,591,315 | Stephanus | Apr. 1, 1952 |

OTHER REFERENCES

Boehm Paper Trade Journal, May 2, 1940, pages 35–38.